US011287646B2

(12) United States Patent
Wu et al.

(10) Patent No.: US 11,287,646 B2
(45) Date of Patent: Mar. 29, 2022

(54) METHOD FOR CORRECTING AN IMAGE, STORAGE MEDIUM AND PROJECTION DEVICE

(71) Applicant: XI'AN ZHONGXING NEW SOFTWARE CO., LTD., Shanxi (CN)

(72) Inventors: Yonghui Wu, Guangdong (CN); Yinzhong Zhang, Guangdong (CN)

(73) Assignee: XI'AN ZHONGXING NEW SOFTWARE CO., LTD., Shanxi (CN)

(*) Notice: Subject to any disclaimer, the term of this patent is extended or adjusted under 35 U.S.C. 154(b) by 324 days.

(21) Appl. No.: 16/551,918

(22) Filed: Aug. 27, 2019

(65) Prior Publication Data
US 2019/0384056 A1 Dec. 19, 2019

Related U.S. Application Data

(63) Continuation of application No. PCT/CN2018/072571, filed on Jan. 15, 2018.

(30) Foreign Application Priority Data

Mar. 24, 2017 (CN) .......................... 201710184293.7

(51) Int. Cl.
*G02B 27/42* (2006.01)
*G06T 5/00* (2006.01)
(Continued)

(52) U.S. Cl.
CPC ...... *G02B 27/0043* (2013.01); *G02B 27/4211* (2013.01); *G06T 5/006* (2013.01); *H04N 9/3141* (2013.01); *H04N 9/3179* (2013.01)

(58) Field of Classification Search
None
See application file for complete search history.

(56) References Cited

U.S. PATENT DOCUMENTS 6,416,186 B1  7/2002  Nakamura
2015/0029465 A1* 1/2015 Ishikawa .................. G09G 5/00
353/30

FOREIGN PATENT DOCUMENTS

CN    101516013 B    1/2011
CN    102207424 A    10/2011
(Continued)

OTHER PUBLICATIONS

Japanese Search Report for Japanese Application No. 2019-546293 dated Nov. 25, 2020.
(Continued)

*Primary Examiner* — Michelle M Iacoletti
*Assistant Examiner* — Danell L Owens
(74) *Attorney, Agent, or Firm* — Heslin Rothenberg Farley & Mesiti PC

(57) ABSTRACT

Disclosed is a method for correcting an image, a storage medium, and a projection device. The method is applied to a projection device, the projection device including a grating and a light generation component. The method includes: determining, in a region in which a projection image projected by the projection device overlaps with a projected image projected through the grating by detection light output from the projection device, diffraction spots having a diameter not equal to a preset value as target diffraction spots; determining a group of target diffraction spots continuously arranged in a horizontal or vertical direction, as well as diffraction spots having a diameter equal to the preset value that are respectively located on both sides of the group of target diffraction spots, as a region to be corrected; determining an angle $\alpha_i$ between a plane of an $i^{th}$ diffraction spot and a plane of an $(i+1)^{th}$ diffraction spot that are adjacent in the horizontal or vertical direction in the region to be corrected; and determining a corrected projection length of (Continued)

the $(i+1)^{th}$ diffraction spot according to the preset value and angles $\alpha_1$ to $\alpha_i$.

20 Claims, 13 Drawing Sheets

(51) Int. Cl.
*H04N 9/31* (2006.01)
*G02B 27/00* (2006.01)

(56) References Cited

FOREIGN PATENT DOCUMENTS

| CN | 102472956 A | 5/2012 |
|---|---|---|
| CN | 202563233 U | 11/2012 |
| CN | 102810015 A | 12/2012 |
| CN | 105592310 A | 5/2016 |
| CN | 105657389 A | 6/2016 |
| CN | 105791786 A | 7/2016 |
| CN | 106231276 A | 12/2016 |
| CN | 106327503 A | 1/2017 |
| CN | 102572347 B | 2/2018 |
| JP | H06276465 A | 9/1994 |
| JP | 2001061121 A | 3/2001 |
| JP | 2005033703 A | 2/2005 |
| JP | 2005326247 A | 11/2005 |
| JP | 2009200683 A | 9/2009 |
| WO | 2016147731 A1 | 9/2016 |

OTHER PUBLICATIONS

Search Report for Chinese Patent Application No. 201710184293.7 dated Mar. 16, 2020.
International Search Report (and English translation) and Written Opinion of the International Searching Authority for International Application No. PCT/CN2018/072571 dated Apr. 9, 2018.

* cited by examiner

METHOD FOR CORRECTING AN IMAGE, STORAGE MEDIUM AND PROJECTION DEVICE

CROSS REFERENCE TO RELATED APPLICATIONS

This application is a continuation of International Application No. PCT/CN2018/072571, filed on Jan. 15, 2018, which is based upon and claims priority to Chinese Patent Application No. 201710184293.7, filed on Mar. 24, 2017, the entire contents of each of which are incorporated herein by reference.

TECHNICAL FIELD

The present disclosure relates to the field of image processing, and more particularly, to a method for correcting an image, a storage medium, and a projection device.

BACKGROUND

In daily life, people usually use a projector to project an image onto a plane such as a projection curtain or a wall for display in meetings, classrooms and the like. However, due to environmental factors, the plane such as the projection curtain or the wall is sometimes not an absolute plane. For example, when the draped projection curtain partially wrinkles or protrudes, or the projection wall has a switch or an obstacle, or the curtain is not flat as stirred by wind, a projection picture may be deformed, distorted, and unclear when viewed by a user, thereby affecting use by the user. At present, the deformation or unclearness of the projection screen caused by environmental factors is usually optimized by using a method based on keystone correction. However, the method based on keystone correction can only be used to correct an entire image in a vertical direction, and can neither correct the image in a horizontal direction, nor can correct a certain region in the image.

SUMMARY

A general summary of subject matters detailed in this disclosure is provided below. The summary is not intended to limit the scope of the claims.

Embodiments of the present disclosure provide a method for correcting an image, a storage medium, and a projection device.

Some embodiments of the present disclosure provide a method for correcting an image, applied to a projection device, the projection device including a grating and a light generation component, and the method including:

Determining, in a region in which a projection image projected by the projection device overlaps with a projected image projected through the grating by detection light output from the projection device, diffraction spots having a diameter not equal to a preset value as target diffraction spots;

Determining a group of target diffraction spots continuously arranged in a horizontal or vertical direction, as well as diffraction spots having a diameter equal to the preset value that are respectively located on both sides of the group of target diffraction spots, as a region to be corrected;

Determining an angle $\alpha_i$ between a plane of an $i^{th}$ diffraction spot and a plane of an $(i+1)^{th}$ diffraction spot that are adjacent in the horizontal or vertical direction in the region to be corrected; where i=1, 2, . . . , N, and N is the total number of spots in the region to be corrected; and Determining a corrected projection length of the $(i+1)^{th}$ diffraction spot according to the preset value and angles $\alpha_1$ to $\alpha_i$.

Some embodiments of the present disclosure provide a computer storage medium, the computer storage medium storing computer executable instructions, and the computer executable instructions being configured to execute the method provided above.

Some embodiments of the present disclosure provide a projection device, the projection device at least comprising a grating, a light generation component, a processor, and a storage medium configured to store an executable instruction.

The processor is configured to execute the stored executable instruction, and the executable instruction includes:

Determining, in a region in which a projection image projected by the projection device overlaps with a projected image projected through the grating by detection light output from the projection device, diffraction spots having a diameter not equal to a preset value as target diffraction spots;

Determining a group of target diffraction spots continuously arranged in a horizontal or vertical direction, as well as diffraction spots having a diameter equal to the preset value that are respectively located on both sides of the group of target diffraction spots, as a region to be corrected;

Determining an angle $\alpha_i$ between a plane of an $i^{th}$ diffraction spot and a plane of an $(i+1)^{th}$ diffraction spot that are adjacent in the horizontal or vertical direction in the region to be corrected; where i=1, 2, . . . , N, and N is the total number of spots in the region to be corrected; and Determining a corrected projection length of the $(i+1)^{th}$ diffraction spot according to the preset value and angles $\alpha_1$ to $\alpha_i$.

Some embodiments of the present disclosure provide a method for correcting an image, a storage medium, and a projection device. Firstly, in a region in which a projection image projected by the projection device overlaps with a projected image projected through the grating by detection light output from the projection device, diffraction spots having a diameter not equal to a preset value are determined as target diffraction spots. Then, a group of target diffraction spots continuously arranged in the horizontal or vertical direction, as well as diffraction spots having a diameter equal to the preset value that are respectively located on both sides of the group of target diffraction spots are determined as a region to be corrected. Next, an angle $\alpha_i$ between a plane of the $i^{th}$ diffraction spot and a plane of the $(i+1)^{th}$ diffraction spot that are adjacent in the horizontal or vertical direction in the region to be corrected is determined. Finally, a corrected projection length of the $(i+1)^{th}$ diffraction spot is determined according to the preset value and angles $\alpha_1$ to $\alpha_i$. In this way, by projecting diffraction spots generated through the grating by detection light onto the projection picture, and positioning the region to be corrected in the horizontal or vertical direction in the projection picture, a corrected projection length of each diffraction spot in the region to be corrected can be determined as a correction basis. Thus, correction of a deformed region can be implemented in the horizontal or vertical direction without correcting the entire projection image, which can greatly reduce computational complexity and further improve correction efficiency.

Other aspects will be apparent upon reading and understanding the detailed description and drawings.

BRIEF DESCRIPTION OF THE DRAWINGS

FIG. 1-2 shows a schematic diagram of positions of respective components of a projection device and a schematic diagram of a projection picture according to some embodiments of the present disclosure;

FIG. 2 is a spatial positional relationship diagram of adjacent diffraction spots according to some embodiments of the present disclosure;

FIG. 3-1 is a schematic diagram of positions of respective components of a projection device and a schematic diagram of a projection picture according to some embodiments of the present disclosure;

FIG. 3-2 is a schematic diagram of infrared light passing through a dot-matrix holographic stereo grating and projected as a diffraction spot array according to some embodiments of the present disclosure;

FIG. 3-3 is a schematic diagram I of a spatial positional relationship of adjacent diffraction spots according to some embodiments of the present disclosure;

FIG. 3-4 is a schematic diagram II of a spatial positional relationship of the adjacent diffraction spots according to some embodiments of the present disclosure;

FIG. 3-5 is a schematic diagram of a spatial positional relationship of four adjacent diffraction spots according to some embodiments of the present disclosure;

FIG. 3-6 is a schematic diagram of a connection line of the four adjacent diffraction spots in space according to some embodiments of the present disclosure;

FIG. 3-7 is a schematic diagram of spatial positions of a pleated surface and a plane according to some embodiments of the present disclosure;

FIG. 3-8 is a schematic flow chart of implementing an image correction method according to some embodiments of the present disclosure;

FIG. 4-1 is a structural schematic diagram I of an image correction apparatus according to some embodiments of the present disclosure;

FIG. 4-2 is a structural schematic diagram II of the image correction apparatus according to some embodiments of the present disclosure;

FIG. 4-3 is a structural schematic diagram of a third determining module in a structure of the image correction apparatus according to some embodiments of the present disclosure; and, FIG. 5 is a schematic diagram of an exemplary projection device according to some embodiments of the present disclosure.

DETAILED DESCRIPTION

The specific technical solutions of the present disclosure will be described below in details by reference to the drawings related to the some embodiments of the present disclosure. The following embodiments are merely used for explaining the present disclosure, and not intended to limit the present disclosure.

Example One

Figure 1:
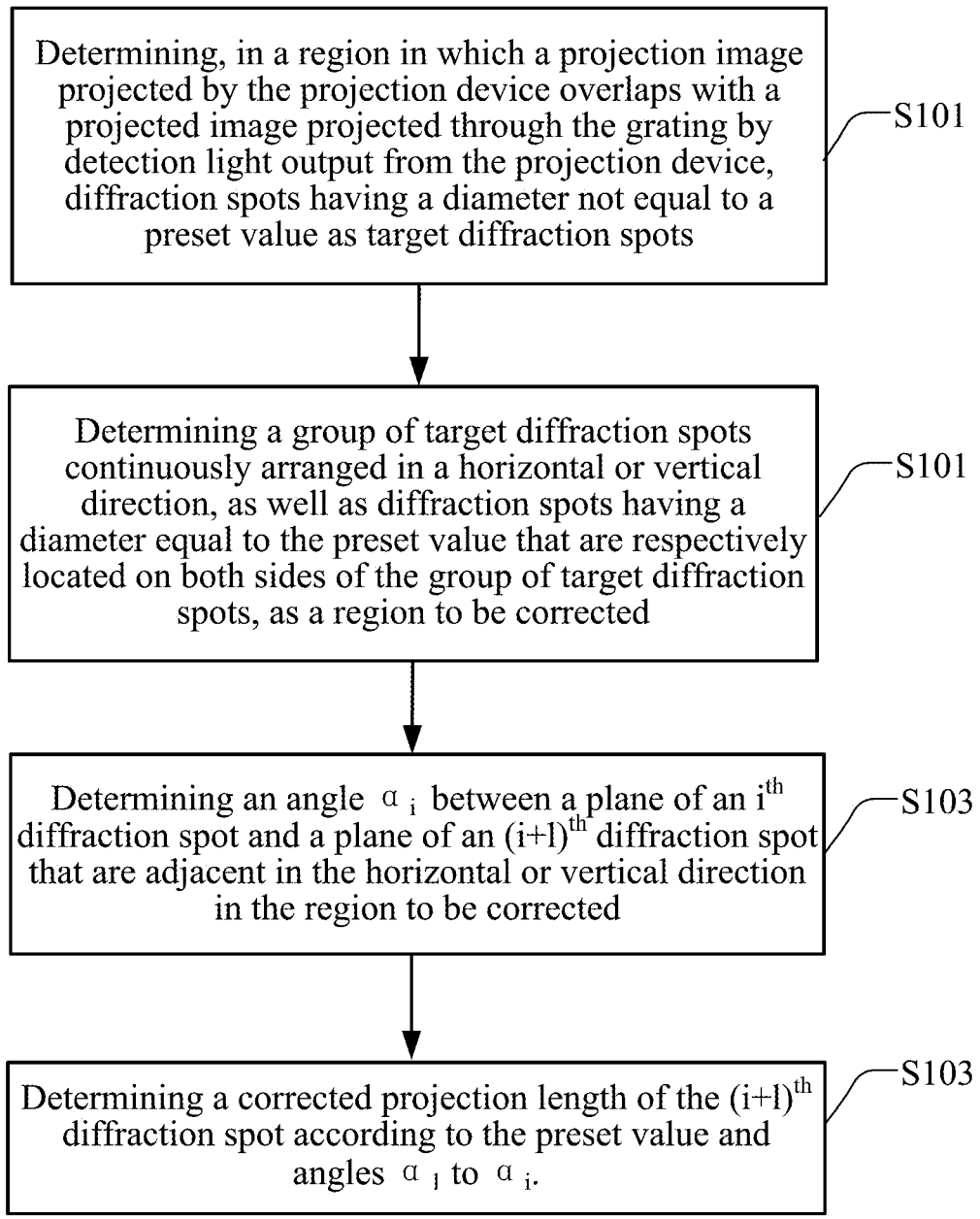
FIG. 1-1 is a schematic flow chart of implementing an image correction method according to some embodiments of the present disclosure.

Some embodiments of the present disclosure provide an image correction method. FIG. 1-1 is a schematic flow chart of implementing the image correction method according to some embodiments of the present disclosure. As shown in FIG. 1-1, the method includes:

S101: determining, in a region in which a projection image projected by a projection device overlaps with a projected image projected through a grating by detection light output from the projection device, diffraction spots having a diameter not equal to a preset value as target diffraction spots.

Here, the preset value is a diameter of a diffraction spot not deformed, so a target diffraction spot is a diffraction spot deformed.

In actual application, it is generally required the projected image to be larger than the projection image, so as to ensure that the projection image is entirely located within the overlapped region between the projection image and the projected image.

An image correction method provided by some embodiments of the present disclosure can be executed by an image correction apparatus. In actual application, the image correction apparatus may be, for example, a processor in a projector, where the projector at least includes a projection component, an image collection component, a light generation device and a grating. Where the projection component is a series of elements for projecting an image in the projector; for example, the projection component may include a projection lens, a Digital Micro-mirror Device (DMD) chip, and the like. The light generation device emits detection light for correcting the projection picture, and the detection light may be ultraviolet light, X-ray, or the like. In other embodiments of the present disclosure, infrared light may also be selected as detection light, because infrared light does not harm a human body and is invisible to human eyes, and does not affect viewing of a projection picture by a person; when the detection light is infrared light, the light generation device may be an infrared spectrum emitter. The grating may be a dot-matrix holographic stereo grating; each unit grating of the dot-matrix holographic stereo grating resembles a lens, and has a function of focusing imaging, which allows the detection light to be projected onto the projection screen, to generate a diffraction spot; and a pleat region on a projection surface is corrected through a spatial position of the diffraction spot. The image collection component may be a camera that can photograph the detection light. For example, with respect to infrared light, the image collection component may be an infrared zoom camera.

Figures 1, 2:
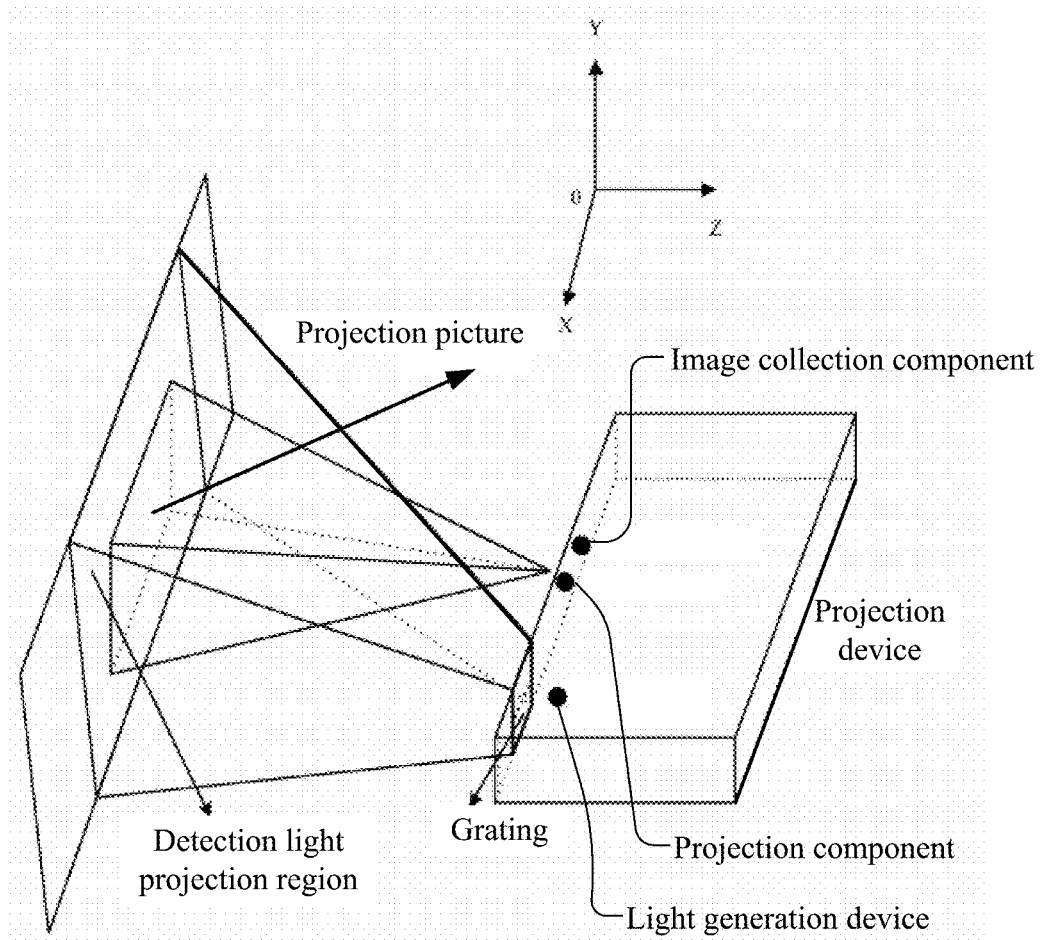
Figure 2:
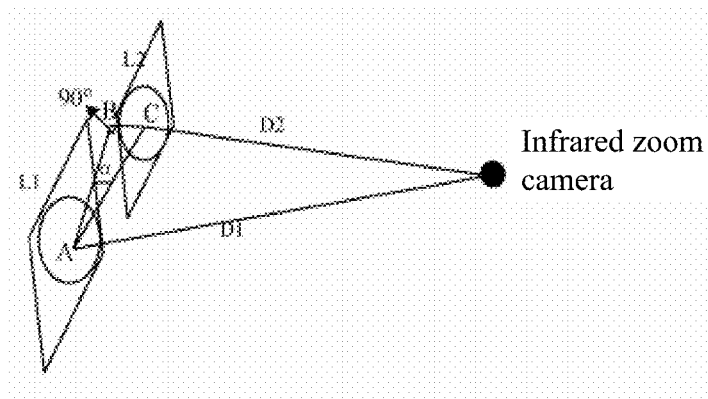

A positional relationship of the projection component, the image collection component, the light generation device and the grating in the image correction apparatus is as shown in FIG. 1-2, and an upper right corner in FIG. 1-2 indicates a spatial coordinates system in which the projection device is located, wherein, a camera lens in the projection component, the image collection component and the grating are located on a same horizontal plane with a Y-axis, and the light generation device is located right behind the grating (in a direction away from the projection surface); wherein, distances from the image collection component to the grating and the projection component may be as close as possible in an X-axis direction.

Now there is an image to be projected in the projector, and the user wants to project the image onto the projection surface by the projector to enlarge and view, then the image projected onto the projection surface by the projector is the projection image.

S102: determining a group of target diffraction spots continuously arranged in a horizontal or vertical direction, as well as diffraction spots having a diameter equal to the preset value that are respectively located on both sides of the group of target diffraction spots, as a region to be corrected.

Here, if the region to be corrected is horizontal, the region to be corrected starts from a first diffraction spot having a diameter equal to the preset value on a left side of a first target diffraction spot, from left to right, up to a first diffraction spot having a diameter equal to the preset value on a right side of a last target diffraction spot.

If the region to be corrected is vertical, the region to be corrected starts from a first diffraction spot having a diameter equal to the preset value above a first target diffraction spot, from top to bottom, up to a first diffraction spot having a diameter equal to the preset value below a last target diffraction spot.

S103: determining an angle $\alpha_i$ between a plane of the $i^{th}$ diffraction spot and a plane of the $(i+1)^{th}$ diffraction spot that are adjacent in the horizontal or vertical direction in the region to be corrected.

Here, S103 further includes:

S103a: determining a line segment having a first circle center and a second circle center as end points as a first line segment.

Figures 1, 3:
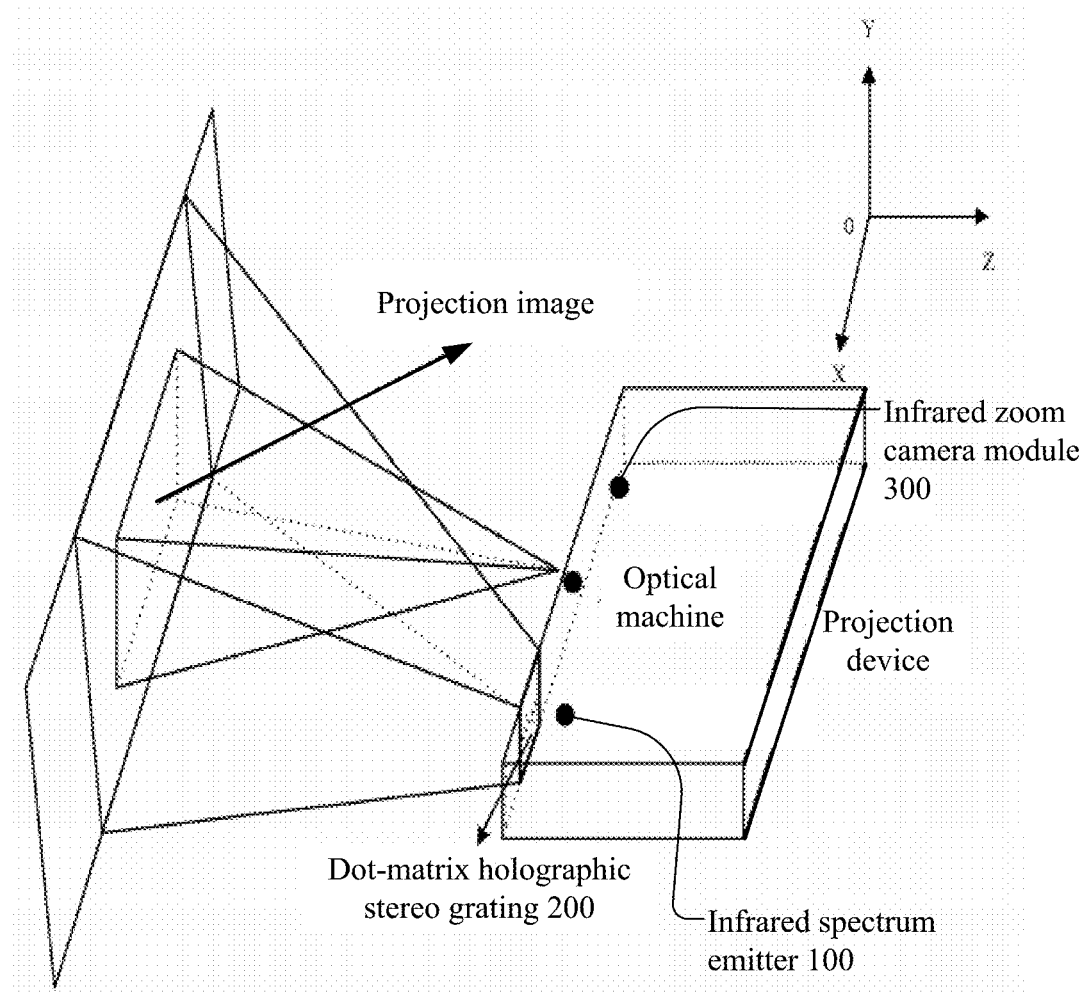
Figures 2, 3:
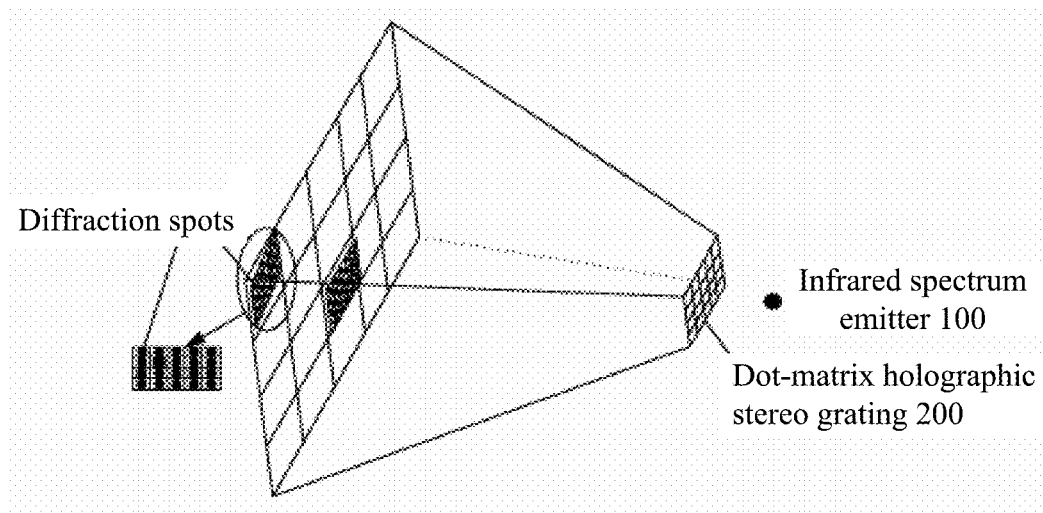
Figure 3:
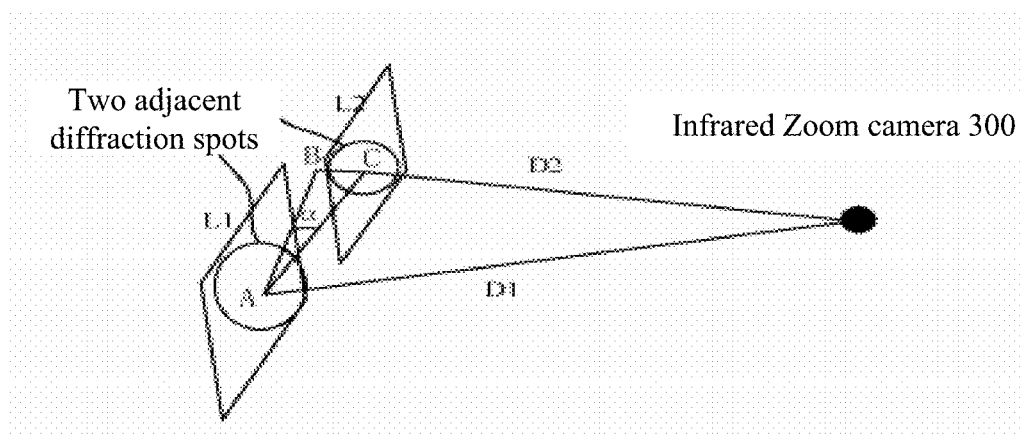

Here, the first circle center is a circle center of the $i^{th}$ diffraction spot, and the second circle center is a circle center of the $(i+1)^{th}$ diffraction spot. FIG. 3-3 is a schematic diagram I of a spatial positional relationship of adjacent diffraction spots according to the embodiment of the present disclosure; and as shown in FIG. 3-3, the first circle center is point A, the second circle center is point C, and line segment AC having point A and point C as end points is the first line segment.

S103b: determining a line segment having the first circle center and a first projection point as end points as a third line segment.

Here, the first projection point is a projection point of the second circle center on the plane of the $i^{th}$ diffraction spot; as shown in FIG. 3-3, the first projection point is point B, and line segment BC with point B and point C as end points is the third line segment.

S103c: determining an angle between the first line segment and the third line segment as the angle $\alpha_i$.

Here, as shown in FIG. 3-3, ∠BAC is just the angle $\alpha_i$ between the first line segment and the third line segment.

S104: determining a corrected projection length of the $(i+1)^{th}$ diffraction spot according to the preset value and angles $\alpha_1$ to $\alpha_i$.

Here, since the first diffraction spot in the region to be corrected is a spot not deformed, a corrected projection length of a $2^{nd}$ diffraction spot in the region to be corrected is calculated when i=1. At this time, the corrected projection length of the $2^{nd}$ diffraction spot is determined according to the preset value, that is, the diameter of the first normal spot and the angle $\alpha_1$. In some other embodiments of the present disclosure, the corrected projection length of the $2^{nd}$ diffraction spot is determined according to Formula (1-1):

$$len_2 = \frac{len}{\cos\alpha_1}; \qquad (1-1)$$

Here, in Formula (1-1), len is the preset value, $\cos \alpha_i$ is a cosine value of the angle $\alpha_1$, and $len_2$ is the corrected projection length of the $2^{nd}$ diffraction spot.

An angle between the $2^{nd}$ diffraction spot and a $3^{rd}$ diffraction spot is $\alpha_2$, and then a corrected projection length of the $3^{rd}$ diffraction spot can be obtained according to Formula (1-2):

$$len_3 = \frac{len_2}{\cos\alpha_2}; \qquad (1-2)$$

Here, in Formula (1-2), $len_2$ is the corrected projection length of the $2^{nd}$ diffraction spot, and $len_3$ is the corrected projection length of the $3^{rd}$ diffraction spot.

Formula (1-3) is derived according to Formula (1-1) and Formula (1-2):

$$len_3 = \frac{len}{\cos\alpha_1 \times \cos\alpha_2}; \qquad (1-3)$$

So on and so forth, then a corrected projection length of the $(i+1)^{th}$ diffraction spot can be determined according to Formula (1-4):

$$len_{i+1} = \frac{len}{\cos\alpha_1 \times \cos\alpha_2 \times \ldots \times \cos\alpha_i}; \qquad (1-4)$$

Here, in Formula (1-4), len is the preset value, $\cos \alpha_1$ is the cosine value of the angle $\alpha_1$, and $len_{i+1}$ is the corrected projection length of the $(i+1)^{th}$ diffraction spot.

Some embodiments of the present disclosure provide an image correction method. Firstly, in a region in which a projection image projected by the projection device overlaps with a projected image projected through the grating by detection light output from the projection device, diffraction spots having a diameter not equal to a preset value are determined as target diffraction spots. Then, a group of target diffraction spots continuously arranged in the horizontal or vertical direction, as well as diffraction spots having a diameter equal to the preset value that are respectively located on both sides of the group of target diffraction spots are determined as a region to be corrected. Next, an angle $\alpha_i$ between a plane of the $i^{th}$ diffraction spot and a plane of the $(i+1)^{th}$ diffraction spot that are adjacent in the horizontal or vertical direction in the region to be corrected is determined; and finally, a corrected projection length of the $(i+1)^{th}$ diffraction spot is determined according to the preset value and the angles $\alpha_1$ to $\alpha_i$. In this way, by projecting diffraction spots generated through the grating by detection light onto the projection picture, and positioning the region to be corrected in the horizontal or vertical direction in the projection picture, the corrected projection lengths of the respective diffraction spots in the region to be corrected can be determined as a correction basis. Thus, the deformed region can be corrected in the horizontal or vertical direction without correcting the entire projection image, which can greatly reduce computational complexity and further improve correction efficiency.

Example Two

Based on the above embodiments, some embodiments of the present disclosure provide an image correction method, applied to an image correction apparatus. The projection device at least includes a grating and a light generation component, and the method includes:

S201: determining an image to be projected by the projection device.

S202: projecting the image to be projected on a projection surface with a projection component on the projection device.

Here, the projection surface may be a plane such as a projection curtain or a wall that can present an image.

S203: determining, in a region in which a projection image projected by the projection device overlaps with a projected image projected through the grating by detection light output from the projection device, diffraction spots having a diameter not equal to a preset value as target diffraction spots.

Here, a light generation device in the projection device emits detection light, and the detection light may be ultraviolet light, X-ray, or the like. In other embodiments of the present disclosure, infrared light may also be selected as detection light, because infrared light does not harm a human body and is invisible to human eyes, and does not affect viewing of a projection picture by a person; and when the detection light is infrared light, the light generation device may be an infrared spectrum emitter.

The detection light emitted by the light generation component in the projection device is projected through the grating onto the projection surface, to form a projection region on the projection surface, and a picture of the projection region formed is a diffraction spot array. When the projection surface is a plane, the diffraction spots are a plurality of circles arranged in an array within a same plane, circles being tangent to one another, and having a same diameter. When the projection surface is not flat, the diameter of the diffraction spot of the pleat region on the projection surface will change, and become different from the diameter of the diffraction spot on the plane; a diffraction spot formed when projected on the plane is referred to as a unit diffraction spot (which may be understood as a standard diffraction spot), and a diameter of the unit diffraction spot can be obtained from Formula (2-1):

$$\text{Unit diffraction spot diameter } \Phi = \frac{\text{projection picture width}}{25.4 * \text{grating density}} \quad (2\text{-}1)$$

Where, the grating density refers to the number of grating lines in one-inch width, and is represented by a symbol LPI (Line Per Inch), wherein, a relationship between a grating density range and an optimal projection viewing distance (with respect to projection having a projection distance between 1 m to 3 m) is that: the optimal projection viewing distance is about 300 cm when the grating density ranges from 21 LPI to 30 LPI; the optimal projection viewing distance is about 200 cm when the grating density ranges from 35 LPI to 40 LPI; and the optimal projection viewing distance is about 100 cm when the grating density ranges from 50 LPI to 60 LPI. In general, the higher the LPI value of a grating material, the finer the grating line. In theory, the higher the grating density selected, the higher the accuracy of image correction, but the higher the grating density, the higher the requirement on an image processing module. Therefore, in this embodiment, the grating density of 30 LPI is selected. The projection picture width is obtained according to Formula (2-2):

$$\text{Projection picture width} = \frac{\text{projection distance}}{\text{projection ratio Ratio}}; \quad (2\text{-}2)$$

In Formula (2-2), the projection ratio Ratio is an intrinsic property of the projection device. The projection distance is a distance from an image collecting module to one of the diffraction spots, and the projection distance is obtained according to Formula (2-3):

$$\frac{1}{d} + \frac{1}{v} = \frac{1}{f}; \quad (2\text{-}3)$$

In Formula (2-3), the projection distance is d, the image distance is v, and the focal length is f; where, the image distance v and the focal length f are intrinsic properties of the image collecting module, and thus are known quantities.

An intersection region is generated between a light projection region formed of the detection light projected through the grating onto the projection surface and the projection picture, and the projection picture of the intersection region may be corrected according to the diffraction spots in the intersection region. When a projection range of the detection light emitted by the light generation component encompasses the entire projection picture, the entire projection picture may be corrected.

In some other embodiments of the present disclosure, a diffraction spot having a diameter not equal to the unit diffraction spot diameter $\Phi_{standard}$ is determined as a target diffraction spot.

S204: determining a group of target diffraction spots continuously arranged in a horizontal or vertical direction, as well as diffraction spots having a diameter equal to the preset value that are respectively located on both sides of the group of target diffraction spots, as a region to be corrected.

S205: determining an angle $\alpha_i$ between a plane of the $i^{th}$ diffraction spot and a plane of the $(i+1)^{th}$ diffraction spot that are adjacent in the horizontal or vertical direction in the region to be corrected.

Where, i=1, 2, ..., N, and N is the total number of spots in the region to be corrected.

In some other embodiments of the present disclosure, an implementation process of S205: determining an angle $\alpha_i$ between a plane of the $i^{th}$ diffraction spot and a plane of the $(i+1)^{th}$ diffraction spot that are adjacent in the horizontal or vertical direction in the region to be corrected includes:

S205a: determining a line segment having a first circle center and a second circle center as end points as a first line segment;

Here, the first circle center is a circle center of the $i^{th}$ diffraction spot, and the second circle center is a circle center of the $(i+1)^{th}$ diffraction spot.

S205b: determining a line segment having the first circle center and a first projection point as end points as a third line segment;

Here, the first projection point is a projection point of the second circle center on a plane of the $i^{th}$ diffraction spot.

S205c: determining an angle between the first line segment and the third line segment as an angle $\alpha_i$.

S205d: determining a line segment having the first projection point and the second circle center as end points as a second line segment;

S205e: determining a length of the third line segment and a length of the second line segment, respectively;

Here, the length of the third line segment is determined according to Formula (2-4):

$$d_1 = \frac{L1 + L2}{2}; \quad (2\text{-}4)$$

In Formula (2-4), L1 is a diameter of the $i^{th}$ diffraction spot, L2 is a diameter of the $(i+1)^{th}$ diffraction spot, and $d_1$ is the length of the third line segment.

The length of the second line segment is determined according to Formula (2-5):

$$d_2 = D1 - D2 \quad (2\text{-}5);$$

In Formula (2-5), D1 is a projection distance of the $i^{th}$ diffraction spot, D2 is a projection distance of the $(i+1)^{th}$ diffraction spot, and $d_2$ is the length of the second line segment.

S205f: determining the angle $\alpha_i$ according to the lengths of the third line segment and the second line segment.

Here, the angle $\alpha_i$ is determined according to Formula (2-6):

$$\alpha_i = \arctan\frac{d_2}{d_1}; \quad (2\text{-}6)$$

In Formula (2-6), arctan ( ) is an arctangent function.

In an example, FIG. 2 is a spatial positional relationship diagram of adjacent diffraction spots according to some embodiments of the present disclosure. As shown in FIG. 2, L1 is the $i^{th}$ diffraction spot, and L2 is the $(i+1)^{th}$ diffraction spot. Line segment AB is the first line segment, line segment AC is the second line segment, and point B is the projection point of point C on the plane of the $i^{th}$ diffraction spot, so angle B is a right angle, and triangle ABC is a right-angled triangle. The angle between line segment AB and line segment AC is angle A, and angle A is also an angle between the plane of the $i^{th}$ diffraction spot and the plane of the $(i+1)^{th}$ diffraction spot.

A length between two adjacent diffraction spots can be obtained from a distance between circle centers of the two adjacent diffraction spots, but is not limited to being determined according to the distance between the two adjacent circle centers, wherein, the circle center is one of reference points for determining the length between the two adjacent diffraction spots.

S206: determining a corrected projection length of the $(i+1)^{th}$ diffraction spot according to the preset value and the angles $\alpha_1$ to $\alpha_i$.

Here, the corrected projection length of the $(i+1)^{th}$ diffraction spot is determined according to Formula (2-7):

$$len_{i+1} = \frac{len}{\cos\alpha_1 \times \cos\alpha_2 \times \ldots \times \cos\alpha_i}; \quad (2\text{-}7)$$

In Formula (2-7), len is the preset value, cos $\alpha_1$ is the cosine value of the angle $\alpha_1$, and $len_{i+1}$ is the corrected projection length of the $(i+1)^{th}$ diffraction spot.

S207: determining position information of the $i^{th}$ diffraction spot.

Here, in some other embodiments of the present disclosure, the projection device further comprises an image collecting module. The image collecting module is configured to determine a diameter and position information of a diffraction spot in the intersection region, where the position information includes spatial coordinates information of the diffraction spot.

S208: determining the $i^{th}$ region on the projection picture that is covered by the $i^{th}$ diffraction spot, according to the position information of the $i^{th}$ diffraction spot.

S209: correcting the $i^{th}$ region on the projection picture according to the corrected projection length of the $i^{th}$ diffraction spot.

For explanations of steps or concepts in this embodiment that are the same as those in other embodiments, description in some other embodiments may be referred to, and no details will be repeated here.

Some embodiments of the present disclosure provides the image correction method. Firstly, target diffraction spots are determined; then a group of target diffraction spots continuously arranged in a horizontal or vertical direction, as well as diffraction spots having a diameter equal to the preset value that are respectively located on both sides of the group of target diffraction spots are determined as a region to be corrected. Next, an angle $\alpha_i$ between a plane of the $i^{th}$ diffraction spot and a plane of the $(i+1)^{th}$ diffraction spot that are adjacent in the horizontal or vertical direction in the region to be corrected is determined. Finally, a corrected projection length of the $(i+1)^{th}$ diffraction spot is determined according to the preset value and the angles $\alpha_1$ to $\alpha_i$, and the $(i+1)^{th}$ region is corrected according to the corrected projection length of the $(i+1)^{th}$ diffraction spot. In this way, by projecting diffraction spots generated through the grating by detection light onto the projection picture, and positioning the region to be corrected in the horizontal or vertical direction in the projection picture, according to the position information of the diffraction spot in the region to be corrected, the region to be corrected is corrected. Thus, the deformed region can be corrected in the horizontal or vertical direction without correcting the entire projection image, which can greatly reduce computational complexity and further improve correction efficiency.

Example Three

Some embodiments of the present disclosure provide an image correction method, in which a solution combining infrared light and a dot-matrix holographic stereo grating is used. The dot-matrix holographic stereo grating is placed in front of an infrared beam, the infrared light passes through the dot-matrix holographic stereo grating, evenly projected onto a projection surface, then a projected image of an infrared spectrum is obtained with an infrared zoom camera, and the projected image of the infrared spectrum is composed of diffraction spots arranged in a matrix. When a projection curtain is completely flat, the diffraction spots projected onto the projection curtain through the dot-matrix holographic stereo grating have a uniform size; and when the projection curtain is not flat, for example, the projection curtain is pleated, a diameter of a diffraction spot in a pleat portion of the projection curtain will change. The infrared camera acquires an image of an intersection region between the infrared light projected image and the projection image, the image of the intersection region is output to an image processing module, and the image processing module divides the projection picture into a plurality of unit regions according to a size of the diffraction spot, a size of the projection picture, a focal length of the zoom camera, and a projection ratio of a projector. The image processing module analyzes a pixel size of a projected spot in each dot-matrix unit region, sets a unit region including diffraction spots having a non-uniform pixel size as a target unit region, and calculates a pixel size of adjacent diffraction spots and a distance therebetween in the target unit region, so that angle information and spatial coordinates of a certain spot with respect to an adjacent spot can be known; and then the image processing module performs image processing such as warping, rotation, interpolation, and enhanced restoration on the image of the target unit region, to solve the problem of partial pleat or deformation of the projection picture.

FIG. 3-1 is a structural schematic diagram of composition of an image correction apparatus according to some embodiment of the present disclosure. As shown in FIG. 3-1, the image correction apparatus comprises five portions of an infrared spectrum emitter 100, a dot-matrix holographic stereo grating 200, an infrared zoom camera module 300, an image processing module 400 (not shown) and an optical machine 500; and the five portions are specifically described below:

A primary function of the infrared spectrum emitter 100 is to emit an infrared spectrum of a specific power. In order to meet a requirement on a projection distance of the projector, the infrared spectrum emitter has a specific power generally of 5 watts to 10 watts, and a reflection range of 0 meters to 5 meters. If an emission power of the infrared spectrum emitter is too small, an infrared image photographed by the infrared camera will have poor quality; and if the power of the infrared spectrum emitter is too large, there will be a problem of high power consumption and heat generation of the infrared spectrum emitter. The infrared spectrum emitter is driven by an infrared drive circuit; because infrared light is invisible to human eyes, diffraction spots projected by the infrared spectrum emitter on the projection picture cannot be perceived by the human eyes, and meanwhile, the infrared light is less harmful to a human body. The use of infrared spectrum emitter to emit infrared light for image correction is just the solution selected in this embodiment; and in principle, other invisible light and spectrum emitters that can emit the corresponding invisible light may also be used.

The dot-matrix holographic stereo grating 200: the dot-matrix holographic stereo grating is also referred to as an array stereo grating, a dot grating or a spherical grating. The dot-matrix holographic stereo grating is a biological bionic product, which is designed by studying an imaging principle of an insect compound eye structure, wherein, each unit grating resembles a lens and has a function of focusing imaging, which allows the infrared beam to be projected onto the projection screen; as shown in FIG. 3-2, the infrared light is projected onto the curtain through the dot-matrix holographic stereo grating, to present diffraction spots arranged in a matrix; the small black circles arranged in a matrix in FIG. 3-2 are just the diffraction spots; in FIG. 3-2, though only diffraction spots on two region blocks in the projection image are drawn, other blank regions are also the same as the two region blocks, and are also covered by the diffraction spot arrays.

Grating density generally refers to the number of grating lines in one-inch width, and is represented by a symbol LPI (Line Per Inch), where a relationship between a grating density range and an optimal projection viewing distance (with respect to projection having a projection distance between 1 m to 3 m) is that: the optimal projection viewing distance is about 300 cm when the grating density ranges from 21 LPI to 30 LPI; the optimal projection viewing distance is about 200 cm when the grating density ranges from 35 LPI to 40 LPI; and the optimal projection viewing distance is about 100 cm when the grating density ranges from 50 LPI to 60 LPI. In general, the higher the LPI value of a grating material, the finer the grating line. In theory, the higher the grating density selected in the method according to this embodiment, the higher the accuracy of the image test; but the higher the grating density, the higher the requirement on the image processing module. Therefore, in this embodiment, the grating density of 30 LPI is selected. The unit diffraction spot diameter can be calculated according to the grating density, the projection picture length and width of the optical machine, and the projection distance; and a formula for calculating the unit diffraction spot diameter is Formula (3-1):

$$\text{Unit diffraction spot diameter } \Phi = \frac{\text{projection picture width}}{25.4 * \text{grating density}}; \quad (3\text{-}1)$$

Exemplarily, it is known that the projection distance is 3 m, the projection picture length*width of the optical machine is: 2008 millimeters*1104 millimeters, to calculate the unit grating diameter; and the calculation process is as shown in Formula (3-2):

$$\text{Unit diffraction spot diameter } \Phi = \qquad (3\text{-}2)$$
$$\frac{\text{projection picture width}}{25.4 * \text{grating density}} = \frac{2008}{25.4 * 30} = 2.63 \text{ mm};$$

The infrared zoom camera module 300: after an infrared wavelength function is added to an Infrared (IR) lens filter of the infrared camera, the infrared zoom camera can not only photograph an image of light visible to human eyes, but also can photograph an infrared image. In this embodiment, the infrared zoom camera module 300 functions to acquire an image of an intersection region (a region in which the grating projected image and the projection picture overlaps) acquired by the image processing module 400 and collect an image on a light propagation path of infrared light emitted by an infrared emitter and projected by the dot-matrix stereo grating onto the projection surface.

A lens angle of view of the infrared camera of the infrared zoom camera module is matched with a projection angle of view; usually, when the angle of view of the infrared zoom camera module is selected, a range of the angle of view of the infrared zoom camera module is selected to cover a projector picture. The infrared zoom camera module functions to calculate an object distance d between the projection image and the camera, according to the number of stepping digits of a zoom motor of the zoom camera. A formula for calculating the object distance according to an imaging principle is:

$$\frac{1}{d} + \frac{1}{v} = \frac{1}{f}; \quad (3\text{-}3)$$

In Formula (3-3), the object distance is d, the image distance is v, and the focal length is f; the image distance v can be derived according to a position where the zoom motor stays (the position where the zoom motor stays is just the number of stepping digits of the motor); a position of an optical center of the infrared camera module and a position of an optical center of the optical machine 500 are located on a same horizontal plane with a Y-axis coordinates based on a coordinates system in FIG. 3-1.

The image processing module 400: the image processing module mainly has three functions: 1. analyzing an infrared diffraction spot image acquired by the infrared camera, calculating a pixel size of each spot, and obtaining a distance from the diffraction spot to the infrared spectrum emitter and a tilt angle between adjacent diffraction spots according to a size of a certain diffraction spot; 2. dividing a region of the projection picture, in order to separately perform image correction on a pleat portion of the projection picture, and not to correct other portions without any pleat; 3. performing image processing such as warping, rotation, and image restoration on the pleat portion of the detected image.

The optical machine 500: the optical machine here is an apparatus that projects an image onto a screen, which is usually a projector.

For example, a correction process of the projection image is as follows:

S301: calculating the projection distance.

The projection distance is calculated according to Formula (3-3).

For example, the focal length f of the optical machine is 2 mm, the image distance v of the optical machine=the number of motor steps*the range of the number of steps=20*0.3 mm=6 mm, and the projection distance is calculated according to Formula (3-4):

$$d = \frac{fv}{v-f} = \frac{2*6}{6-2} = 3 \text{ m}; \quad (3\text{-}4)$$

S302: calculating a standard grating diameter $\Phi_{standard}$.

For example, the projection ratio Ratio of the projector is equal to a value of the projection distance divided by the projection picture width; wherein, the projection ratio is an intrinsic property of the optical machine, and can be obtained from a specification of the optical machine. Therefore, a calculation formula of the projection picture width is as follows:

$$\text{Projection picture width} = \frac{d}{\text{Ratio}}; \quad (3\text{-}5)$$

A relationship between the projection picture width, the standard diffraction spot diameter $\Phi_{standard}$ and the number S of diffraction spots stacked in the horizontal direction of the projection picture is as shown in Formula (3-6):

$$\text{Projection picture width} = \Phi_{standard} \times S \quad (3\text{-}6);$$

Since the number of S can be obtained from image information, $\Phi_{standard}$ can be calculated according to Formula (3-6).

303: dividing the projection picture into an M×N array.

The projection picture is divided into an M×N array according to the projection distance of 301 and a length-width ratio of the optical machine. A specific division process is as follows:

The image processing module acquires a plurality of groups of target diffraction spots continuously arranged, calculates the number of target diffraction spots continuously arranged in each group, and divides the projection picture into an M×N array according to a group having the largest number of target diffraction spots continuously arranged.

In one example, when the projection distance acquired by the zoom camera is 3 m, and the length-width ratio of the optical machine picture is 4:3 (in this embodiment, the length-width ratio of 4:3 is taken as an example, and the length-width ratio of the optical machine picture may also be 16:9 or other ratios), the ratio of the optical machine is 1.5. When the projection distance is 3 m, the projection picture width can be calculated according to Formula (3-6): 3/1.5=2 m; and when the picture width is known, the number of diffraction spots in the horizontal direction of the projection picture may also be calculated according to Formula (3-6), $$\text{Projection picture width} = \Phi_{standard} \times S \quad (3\text{-}7);$$

In Formula (3-7), S is the number of diffraction spots in the horizontal direction of the projection picture; according to Formula (3-7), the number S of diffraction spots in the horizontal direction in the projection picture can be calculated. According to the above, it can be seen that in this embodiment the number S of diffraction spots in the horizontal direction of the projection picture is 761.

In one example, the image processing module obtains a group having the largest number of target diffraction spots continuously arranged from a plurality of groups of target diffraction spots continuously arranged in the projection picture; coordinates of the group of target diffraction spots start to change from a $9^{th}$ grating, from left to right in the horizontal direction, up to an $18^{th}$ grating, and the number of target diffraction spots is recorded as 10; then, $$M = \text{ceil}\left(\frac{S}{t}\right) = \text{ceil}\left(\frac{761}{10}\right) = 76; \quad (3\text{-}8)$$

In Formula (3-8), ceil ( ) is an upward rounding function, t is the number of target diffraction spots continuously arranged in a group, and a ratio of M to N is equal to a length-width ratio of the projection picture (which is 4:3 in this embodiment), so N=57. Therefore, the projection picture is divided into a 76*57 array. Where an array block in the 76*57 array that includes the target diffraction spots is the pleat region in the projection image.

304: correcting the pleat region of the projection image.

Diameters of adjacent two diffraction spots are obtained in a pairwise manner.

As shown in FIG. 3-3, L1 and L2 are two adjacent spots located on the pleated surface, D1 is a distance from the infrared zoom camera to the diffraction spot L1, D2 is a distance from the infrared zoom camera to the diffraction spot L2, and D1 and D2 can be obtained according to Formula (3-9) and Formula (3-10); where, a projection ratio of the L1 diffraction spot is Ratio1; and a projection ratio of the L2 diffraction spot is Ratio2;

$$\text{Ratio1} = \frac{D1}{S * \phi_{standard}}; \quad (3\text{-}9)$$

$$\text{Ratio2} = \frac{D2}{t * \phi_{standard}}; \quad (3\text{-}10)$$

Figures 3, 4:
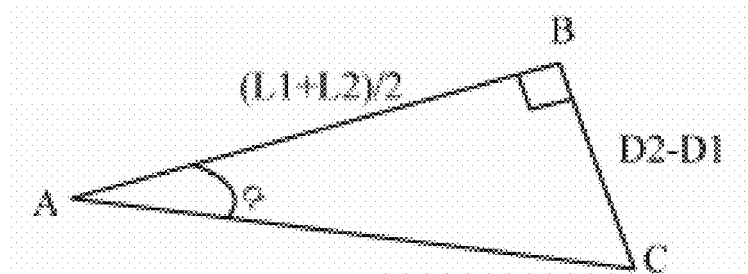

In Formula (3-9) and Formula (3-10), S is the number of diffraction spots in the horizontal direction of the projection picture, and t is the number of target diffraction spots continuously arranged in a group when the projection screen partially protrudes, where, the projection ratio, t and $\Phi_{standard}$ are all known or measurable data. Point B in the diagram is a projection point of the circle center point C of L2 on a plane where L1 is located, so triangle ABC is a right-angled triangle whose angle B is 90°. The image processing module can obtain diameters of L1 and L2, so as to obtain a right-angle side AB of the right-angled triangle ABC: AB=(L1+L2)/2, where, L1 and L2 respectively represent the diameter of the diffraction spot L1 and the diameter of the diffraction spot L2; the angle α between planes where the two adjacent diffraction spots are located is derived, the right-angled triangle ABC in FIG. 3-4 is just the right-angled triangle ABC in FIG. 3-3, and a relative angle α between L1 and L2 is calculated according to Formula (3-11):

$$\alpha = \arctan\frac{2*(D1-D2)}{(L1+L2)};\qquad(3\text{-}11)$$

After the relative angle α between the two adjacent diffraction spots is obtained, a relative angle $\alpha_i$ between L2 and a next adjacent diffraction spot is obtained in like manner, so on and so forth, to calculate a relative angle between two adjacent diffraction spots in a pairwise manner.

Figures 3, 4, 5:
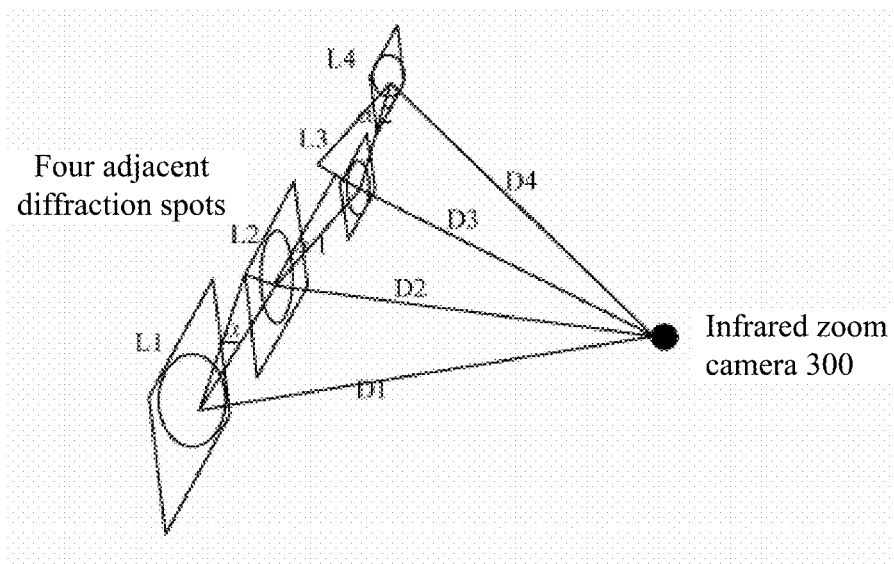
Figures 3, 4, 5, 6:
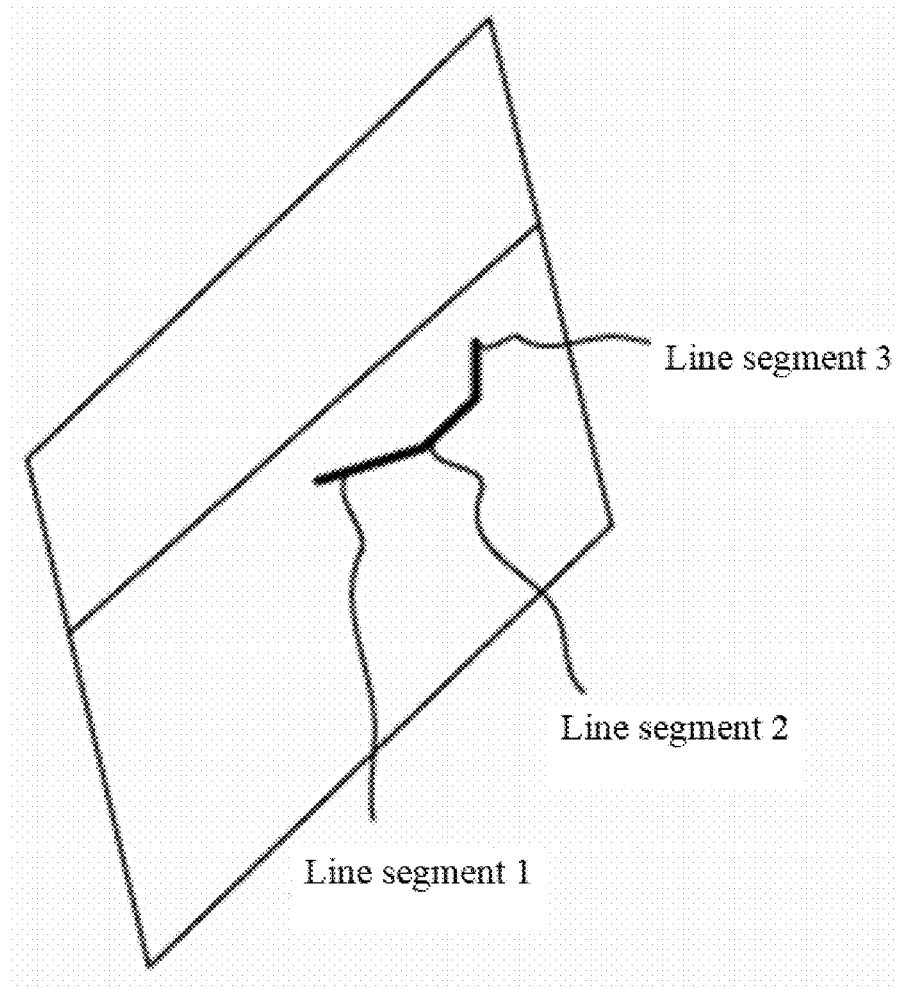
Figures 3, 4, 5, 6, 7:
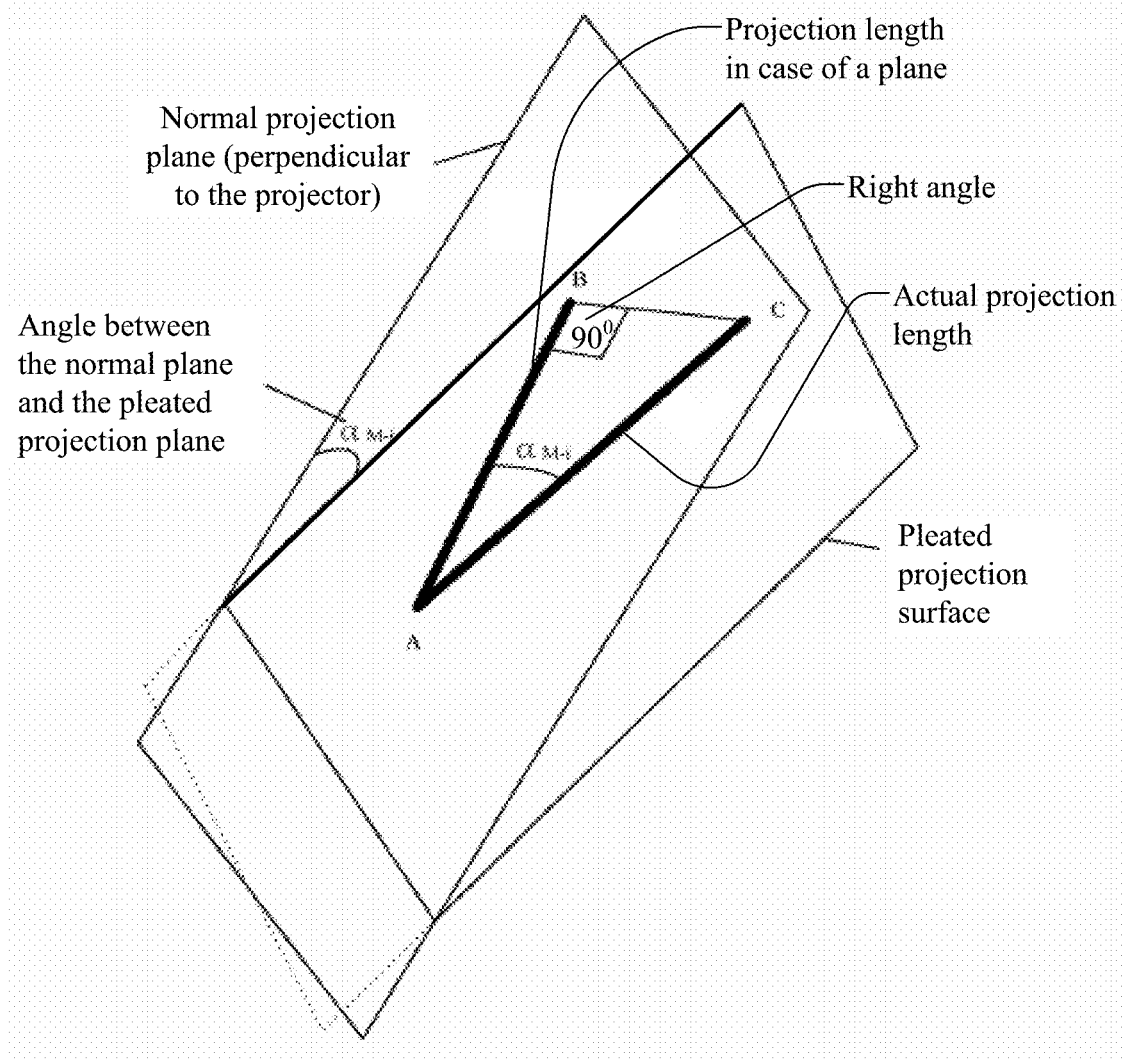
Figures 3, 4, 5, 6, 7, 8:
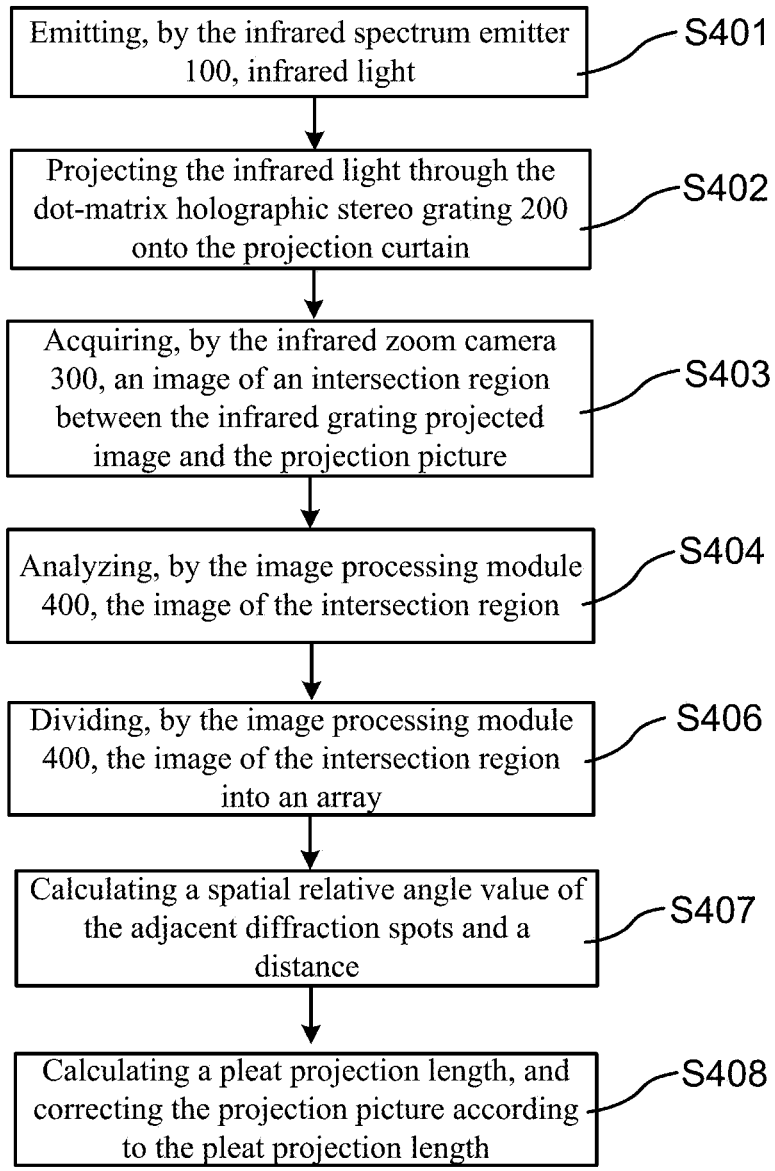
Figures 1, 4:
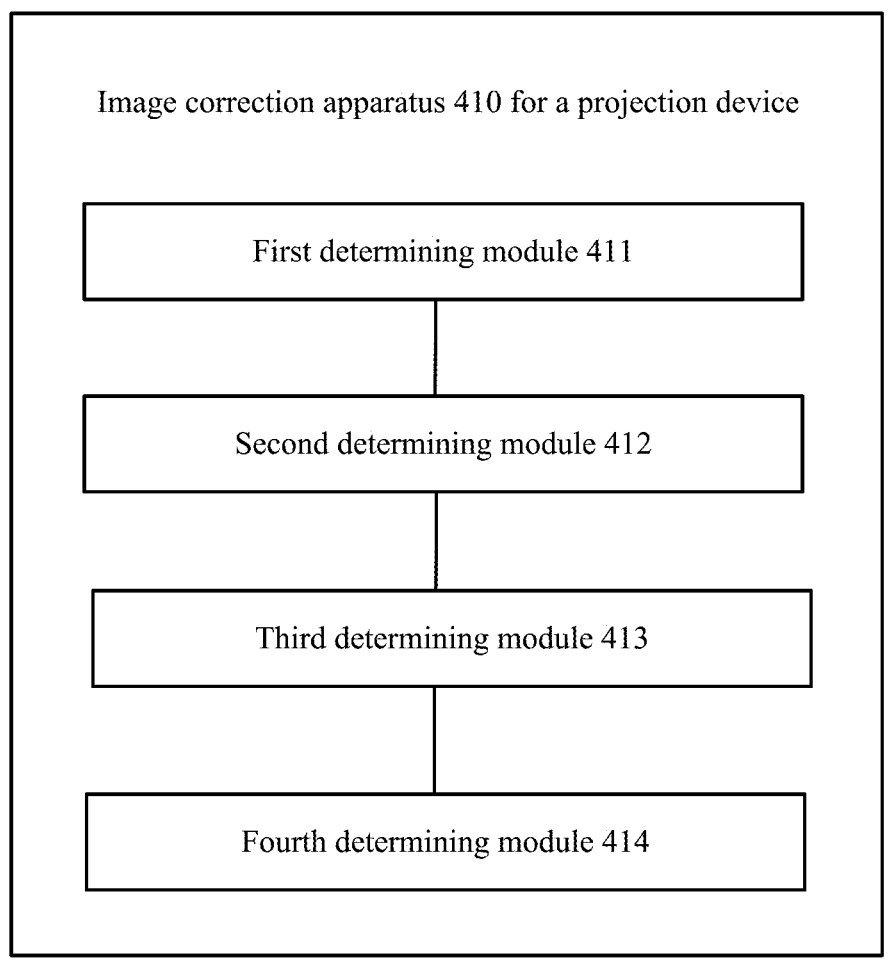
Figures 2, 4:
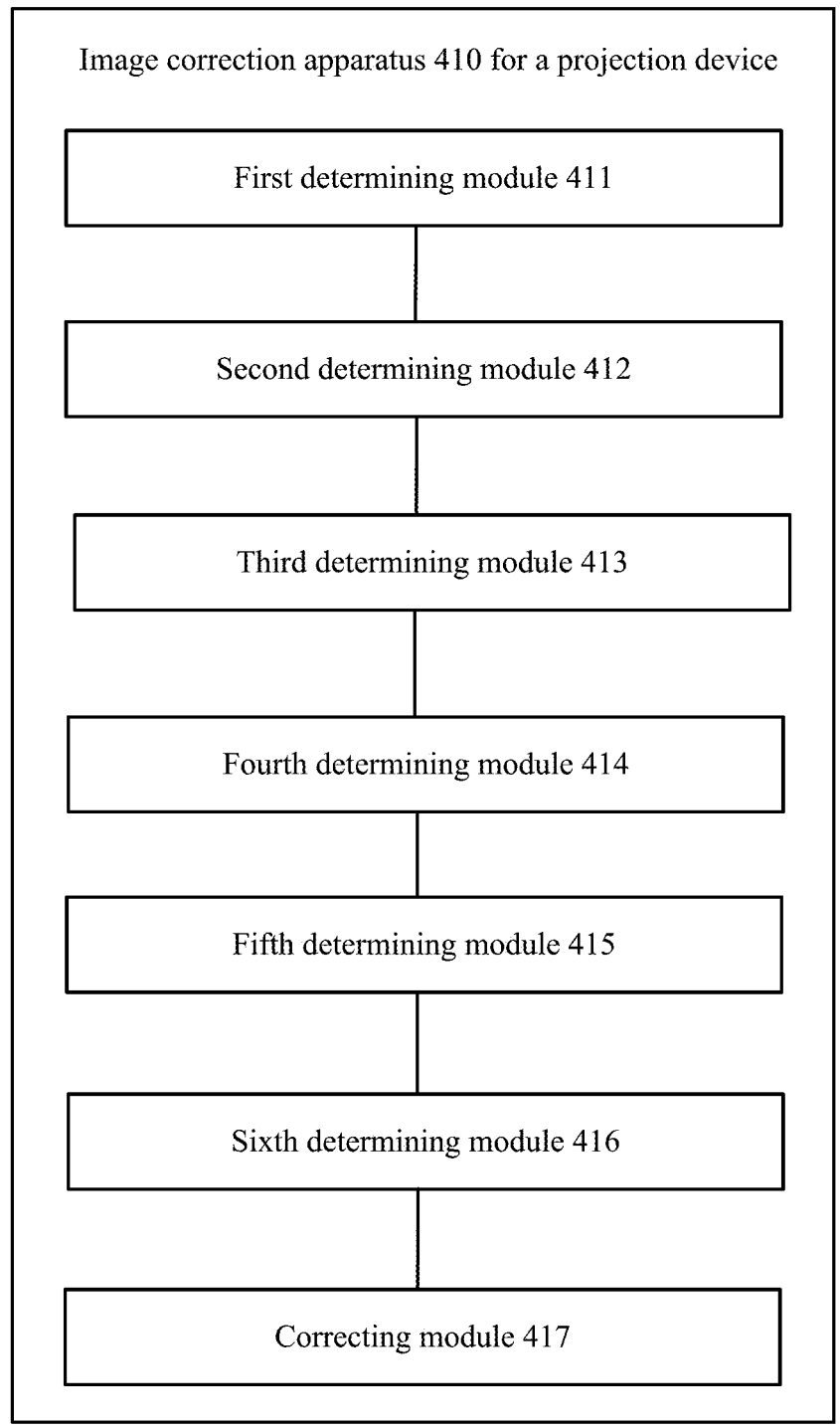
Figures 3, 4:
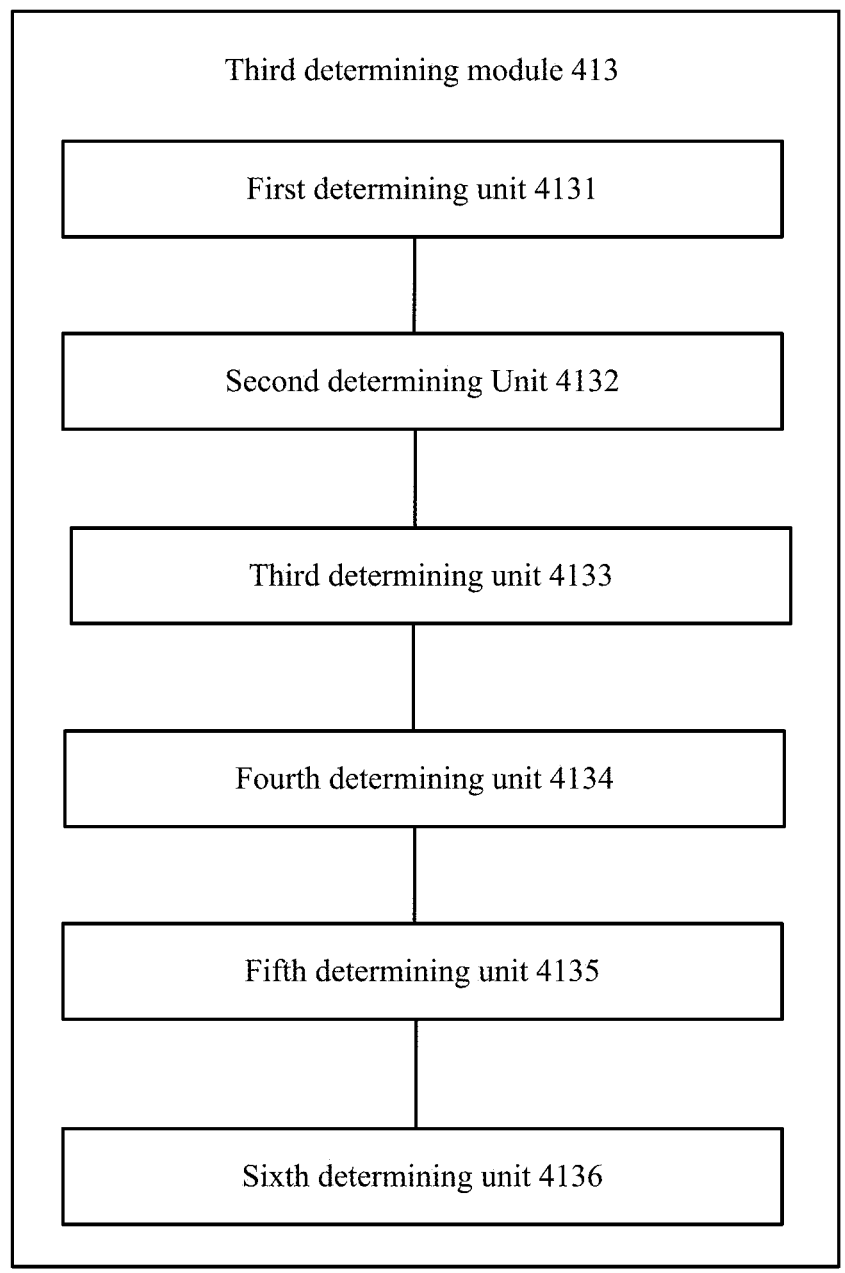
Figure 5:
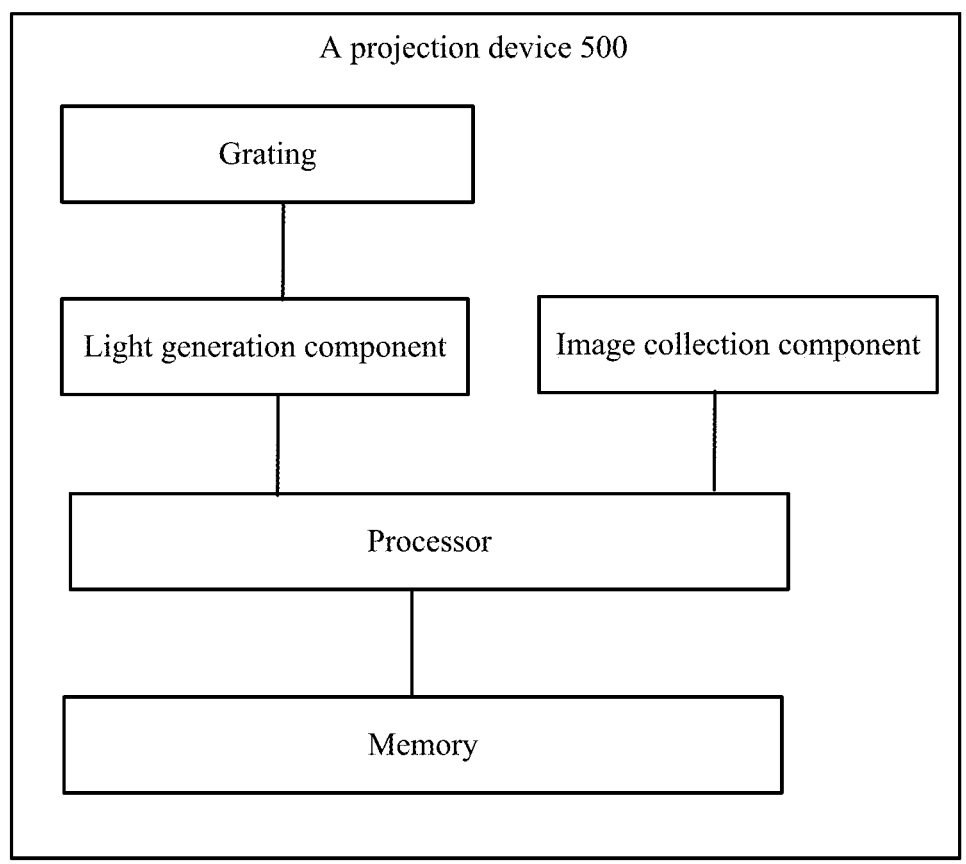

It is illustrated with four adjacent spots as an example; FIG. 3-5 is a schematic diagram of a spatial positional relationship of four adjacent diffraction spots according to some embodiments of the present disclosure. As shown in FIG. 3-5, L1, L2, L3 and L4 in the diagram are four adjacent diffraction spots. According to the above calculation, an angle α between a plane of the L1 diffraction spot and a plane of the L2 diffraction spot, an angle $\alpha_1$ between the plane of the L2 diffraction spot and a plane of the L3 diffraction spot, and an angle $\alpha_2$ between the plane of the L3 diffraction spot and a plane of the L4 diffraction spot can be obtained. Then, a spatial curve of the L1, L2, L3 and L4 diffraction spots is drawn, each diffraction spot being viewed as a point when drawing the curve. FIG. 3-6 is a schematic diagram of a connection line of the four adjacent diffraction spots in space according to the embodiment of the present disclosure; as shown in FIG. 3-6, line segment 1 is a connection line between central points of the L1 diffraction spot and the L2 diffraction spot, the angle between the plane of the L1 diffraction spot and the plane of the L2 diffraction spot is α, a slope of line segment 1 is K1; line segment 2 is a connection line between central points of the L2 diffraction spot and the L3 diffraction spot, the angle between the plane of the L2 diffraction spot and the plane of the L3 diffraction spot is $\alpha_1$, a slope of line segment 2 is K2; line segment 3 is a connection line between central points of the L3 diffraction spot and the L4 diffraction spot, the angle between the plane of the L3 diffraction spot and the plane of the L4 diffraction spot is $\alpha_2$, and a slope of line segment 3 is K3. FIG. 3-6 is a schematic diagram of the spatial curve of the L1, L2, L3 and L4 diffraction spots.

The image is corrected according to the above-described relative angles of adjacent diffraction spots obtained. FIG. 3-7 is a schematic diagram of a relationship between a normal plane and a pleated surface according to some embodiments of the present disclosure. Line segment d1 is a projection length of a plane; when the projection plane is pleated, the angle α is formed between the pleated surface and the plane, but original projection image information of the optical machine remains unchanged, while a length of the projection plane is changed. For example, the projection image length is 100 pixels, the projection plane length is 5 mm, while the pleated surface length is 6 mm, that is to say, in a case where the projection image of 100 pixels is now projected onto a length of 6 mm, as compared with a case where the projection image of 100 pixels is projected onto a plane of 5 mm, projection information per unit length is lessened, so the image is distorted.

As can be seen from FIG. 3-7, point B is the projection point of point C on the slightly pleated surface to the normal projection plane; and according to Formula (3-12), a length of the pleat projection can be calculated, with a pixel as a length unit of the pleat projection:

$$\cos\alpha = \frac{\text{length1}}{\text{length2}};\qquad(3\text{-}12)$$

In Formula (3-12), length1 is a first projection length, that is, the projection length when the projection surface is a plane, which is line segment AB in FIG. 3-7; length2 is a second projection length, that is, the projection length when the projection surface is pleated, which is line segment AC in FIG. 3-7. Positive and negative properties of the relative angle α between the pleated surface and the projection plane are defined as follows: starting from a standard grating, from left to right in the horizontal direction, if projection distances between two adjacent diffraction spots: $D_{left} > D_{left+1}$, then the angle α is positive; if projection distances between two adjacent diffraction spots: $D_{left} < D_{left+1}$, then the angle α is negative.

Steps of a specific implementation process according to some embodiments are as follows, as shown in FIG. 3-8:

S401: emitting, by the infrared spectrum emitter 100, infrared light;

S402: projecting the infrared light through the dot-matrix holographic stereo grating 200 onto the projection curtain;

S403: acquiring, by the infrared zoom camera 300, an image of an intersection region between the infrared grating projected image and the projection picture;

S404: analyzing, by the image processing module 400, the image of the intersection region;

S405: dividing, by the image processing module 400, the image of the intersection region into an M×N array;

S406: extracting, by the image processing module 400, a calculation of adjacent diffraction spots of a certain array region;

S407: calculating a spatial relative angle value (or calculating a slope) of the adjacent diffraction spots, and a distance D from the diffraction spot to the infrared zoom camera;

S408: calculating a pleat projection length, and correcting the projection picture according to the pleat projection length.

In one example, FIG. 3-7 is a schematic diagram of the relationship between the normal plane and the pleated surface; line segment d1 is the projection length of the normal plane; when the projection plane is pleated, the angle α is formed between the pleated surface and the normal plane, but original projection image information of the optical machine remains unchanged, while the length of the projection picture is changed, for example, the projection image length is 100 pixels, the normal projection plane length is 5 mm, but the pleated surface length is 6 mm, that is to say, in a case where the projection image of 100 pixels is projected onto a length of 6 mm, projection information per unit length is changed; it can be seen from FIG. 3-8 that, the pleated surface is closer to the projector, and at this time, α is a positive angle.

For example, when the angle α between the plane of the L1 diffraction spot and the plane of the L2 diffraction spot is 60°, the pleated surface length is 2 times the normal projection length. At this time, according to position coordinates corresponding to the diffraction spot, for example, an abscissa: the $25^{th}$ grating (from left to right in the horizontal direction), an ordinate: the $20^{th}$ grating (from top to bottom in the vertical direction), wherein, an origin of the projection plane is a point at a lower left corner of the projection plane, the image processing module locks a position where the projection picture is pleated, and meanwhile, the image processing module enlarges the locked region by 2 times for projection with a photosensitive pixel of a Digital Micromirror Device (DMD) chip in the optical machine that corresponds to the pleat grating acquired.

Some embodiments of the present disclosure provides the image correction method, where by projecting diffraction spots generated through the grating by detection light onto the projection picture, and positioning the region to be corrected in the projection picture, according to position information of the diffraction spot in the region to be corrected, the projection picture is corrected.

Example Four

Some embodiments of the present disclosure provide an image correction apparatus, a projection device at least comprising a grating and a light generation component. FIG. 4-1 is a structural schematic diagram I of composition of the image correction apparatus according to some embodiments of the present disclosure. As shown in FIG. 4-1, the apparatus 410 includes: a first determining module 411, a second determining module 412, a third determining module 413 and a fourth determining module 414, where:

The first determining module 411 is configured to determine, in a region in which a projection image projected by the projection device overlaps with a projected image projected through the grating by detection light output from the projection device, diffraction spots having a diameter not equal to a preset value as target diffraction spots;

The second determining module 412 is configured to determine a group of target diffraction spots continuously arranged in a horizontal or vertical direction, as well as diffraction spots having a diameter equal to the preset value that are respectively located on both sides of the group of target diffraction spots, as a region to be corrected;

The third determining module 413 is configured to determine an angle $\alpha_i$ between a plane of the $i^{th}$ diffraction spot and a plane of the $(i+1)^{th}$ diffraction spot that are adjacent in the horizontal or vertical direction in the region to be corrected; where, i=1, 2, . . . , N, and N is the total number of spots in the region to be corrected;

Here, as shown in FIG. 4-3, the third determining module 413 further includes:

A first determining unit 4131, configured to determine a line segment having a first circle center and a second circle center as end points as a first line segment, wherein, the first circle center is a circle center of the $i^{th}$ diffraction spot, and the second circle center is a circle center of the $(i+1)^{th}$ diffraction spot;

A second determining unit 4132, configured to determine a line segment having the first circle center and a first projection point as end points as a third line segment, wherein, the first projection point is a projection point of the second circle center on a plane of the $i^{th}$ diffraction spot;

A third determining unit 4133, configured to determine an angle between the first line segment and the third line segment as an angle $\alpha_i$;

A fourth determining unit 4134, configured to determine a line segment having the first projection point and the second circle center as end points as a second line segment;

A fifth determining unit 4135, configured to respectively determine a length of the third line segment and a length of the second line segment.

Here, in some other embodiments of the present disclosure, the fifth determining unit further includes:

A first calculating subunit, configured to determine the length of the third line segment according to a diameter of the $i^{th}$ diffraction spot, and a diameter of the $(i+1)^{th}$ diffraction spot;

In an implementation process, the length of the third line segment may be determined according to Formula (4-1):

$$d_1 = \frac{L1 + L2}{2}; \quad (4\text{-}1)$$

In Formula (4-1), L1 is the diameter of the $i^{th}$ diffraction spot, L2 is the diameter of the $(i+1)^{th}$ diffraction spot, and $d_1$ is the length of the third line segment.

A second calculating subunit, configured to determine the length of the second line segment according to a projection distance of the $i^{th}$ diffraction spot, and a projection distance of the $(i+1)^{th}$ diffraction spot.

In an implementation process, the length of the second line segment may be determined according to Formula (4-2):

$$d_2 = D1 - D2 \quad (4\text{-}2);$$

In Formula (4-2), D1 is the projection distance of the $i^{th}$ diffraction spot, D2 is the projection distance of the $(i+1)^{th}$ diffraction spot, and $d_2$ is the length of the second line segment.

A sixth determining unit 4136, configured to determine the angle $\alpha_i$ according to the lengths of the third line segment and the second line segment.

Here, in some other embodiments of the present disclosure, the sixth determining unit is further configured to determine the angle $\alpha_i$ according to Formula (4-3).

$$\alpha_i = \arctan\frac{d_2}{d_1}; \quad (4\text{-}3)$$

In Formula (4-3), arctan ( ) is an arctangent function.

The fourth determining module 414 is configured to determine a corrected projection length of the $(i+1)^{th}$ diffraction spot according to the preset value and angles $\alpha_1$ to $\alpha_i$.

Here, in some other embodiments of the present disclosure, the fourth determining module 414 is further configured to determine the corrected projection length of the $(i+1)^{th}$ diffraction spot according to Formula (4-4), $$len_{i+1} = \frac{len}{\cos\alpha_1 \cos\alpha_2 \times \ldots \times \cos\alpha_i}; \quad (4\text{-}4)$$

In Formula (4-4), len is the preset value, $\cos \alpha_1$ is the cosine value of the angle $\alpha_1$, and $len_{i+1}$ is the corrected projection length of the $(i+1)^{th}$ diffraction spot.

In some other embodiments of the present disclosure, as shown in FIG. 4-2, the apparatus further comprises:

A fifth determining module 415, configured to determine position information of the $i^{th}$ diffraction spot;

A sixth determining module 416, configured to determine the $i^{th}$ region on the projection picture that is covered by the $i^{th}$ diffraction spot, according to the position information of the $i^{th}$ diffraction spot;

A correcting module 417, configured to correct the $i^{th}$ region on the projection picture according to the corrected projection length of the $i^{th}$ diffraction spot.

The above image correction apparatus embodiment is similar to the above method embodiments in description, and has advantageous effects similar to those of the method embodiments. Therefore, no details will be repeated here. With respect to technical details not disclosed in the image correction apparatus embodiments of the present disclosure, please refer to the description of the method embodiments of the present disclosure for understanding, and no details will be repeated in order to save space.

Some embodiments of the present disclosure provide a computer storage medium. The computer storage medium stores computer executable instructions, and the computer executable instructions are configured to execute an image correction method provided above.

Some embodiments of the present disclosure further provide a projection device. The projection device at least includes a grating, a light generation component, a processor, and a storage medium configured to store executable instructions. An example of the projection device 500 according to some embodiments of the present disclosure is shown in FIG. 5.

The processor is configured to execute the stored executable instructions, the executable instruction including:

Determining, in a region in which a projection image projected by the projection device overlaps with a projected image projected through the grating by detection light output from the projection device, diffraction spots having a diameter not equal to a preset value as target diffraction spots;

Determining a group of target diffraction spots continuously arranged in a horizontal or vertical direction, as well as diffraction spots having a diameter equal to the preset value that are respectively located on both sides of the group of target diffraction spots, as a region to be corrected;

Determining an angle $\alpha_i$ between a plane of an $i^{th}$ diffraction spot and a plane of an $(i+1)^{th}$ diffraction spot that are adjacent in the horizontal or vertical direction in the region to be corrected; where i=1, 2, . . . , N, and N is the total number of spots in the region to be corrected; and Determining a corrected projection length of the $(i+1)^{th}$ diffraction spot according to the preset value and angles $\alpha_1$ to $\alpha_i$.

Those ordinarily skilled in the art may understand that, all or part of steps in the method, functional modules/units in the system or the apparatus disclosed above may be implemented as software, firmware, hardware, and suitable combinations thereof. In a hardware implementation mode, division between the functional modules/units as mentioned in the above description does not necessarily correspond to division of the physical components; for example, one physical component may have a plurality of functions, or one function or step may be executed by a plurality of physical components cooperatively. Some or all of the components may be implemented as software executed by a processor, such as a digital signal processor or a microprocessor, or as hardware, or as an integrated circuit, such as an application specific integrated circuit. Such software may be distributed on computer-readable media, and the computer-readable media may include a computer storage medium (or a non-temporary medium) and a communication medium (or a temporary medium). As is well known to those ordinarily skilled in the art, the term computer storage medium includes volatile and nonvolatile, removable and non-removable media implemented in any method or technology for storing information (such as computer-readable instructions, data structures, program modules or other data). The computer storage medium includes, but is not limited to, a random access memory (RAM), a read only memory (ROM), an electrically erasable programmable read-only memory (EEPROM), a flash memory or other memory technology, a portable compact disk read only memory (CD-ROM), a digital versatile disk (DVD) or other optical disk storage, a magnetic cartridge, a magnetic tape, magnetic disk storage or other magnetic storage devices, or any other medium that can be used for storing desired information and can be accessed by a computer. In addition, it is well known to those ordinarily skilled in the art that, the communication medium usually includes computer readable instructions, data structures, program modules, or other data in a modulated data signal, such as a carrier wave or other transmission mechanism, and may include any information delivery medium.

The foregoing embodiments merely are exemplary embodiments of the present disclosure, and not intended to define the scope of the present disclosure.

INDUSTRIAL APPLICABILITY

The embodiments of the present disclosure provide the image correction method and apparatus, the storage medium, and the projection device, wherein, firstly, in a region in which a projection image projected by the projection device overlaps with a projected image projected through the grating by detection light output from the projection device, diffraction spots having a diameter not equal to a preset value are determined as target diffraction spots; then, a group of target diffraction spots continuously arranged in the horizontal or vertical direction, as well as diffraction spots having a diameter equal to the preset value that are respectively located on both sides of the group of target diffraction spots are determined as a region to be corrected; next, an angle $\alpha_i$ between a plane of the $i^{th}$ diffraction spot and a plane of the $(i+1)^{th}$ diffraction spot that are adjacent in the horizontal or vertical direction in the region to be corrected is determined; and finally, a corrected projection length of the $(i+1)^{th}$ diffraction spot is determined according to the preset value and angles $\alpha_1$ to $\alpha_i$. In this way, by projecting diffraction spots generated through the grating by detection light onto the projection picture, and positioning the region to be corrected in the horizontal or vertical direction in the projection picture, a corrected projection length of each diffraction spot in the region to be corrected can be determined as a correction basis. Thus, the deformed region can be corrected in the horizontal or vertical direction without correcting the entire projection image, which can greatly reduce computational complexity and further improve correction efficiency.

What is claimed is:

1. A method for correcting an image, wherein the method is applied to a projection device comprising a grating and a light generation component, the method comprising:
   determining (S101), in a region in which a projection image projected by the projection device overlaps with a projected image projected through the grating by detection light output from the projection device, diffraction spots having a diameter not equal to a preset value as target diffraction spots;
   determining (S102) a group of target diffraction spots continuously arranged in a horizontal or vertical direction, as well as diffraction spots having a diameter equal to the preset value that are respectively located on both sides of the group of target diffraction spots, as a region to be corrected;

determining (S103) an angle $\alpha_i$ between a plane of an $i^{th}$ diffraction spot and a plane of an $(i+1)^{th}$ diffraction spot that are adjacent in the horizontal or vertical direction in the region to be corrected, wherein i=1, 2, . . . , N, and N is the total number of spots in the region to be corrected; and determining (S104) a corrected projection length of the $(i+1)^{th}$ diffraction spot according to the preset value and angles $\alpha_1$ to $\alpha_i$.

2. The method according to claim 1, wherein the determining (S103) an angle $\alpha_i$ between a plane of an $i^{th}$ diffraction spot and a plane of an $(i+1)^{th}$ diffraction spot that are adjacent in the horizontal or vertical direction in the region to be corrected comprises:

determining a line segment having a first circle center and a second circle center as end points as a first line segment, wherein the first circle center is a circle center of the $i^{th}$ diffraction spot, and the second circle center is a circle center of the $(i+1)^{th}$ diffraction spot;

determining a line segment having the first circle center and a first projection point as end points as a third line segment, the first projection point being a projection point of the second circle center on a plane of the $i^{th}$ diffraction spot; and determining an angle between the first line segment and the third line segment as the angle $\alpha_i$.

3. The method according to claim 2, wherein the determining (S103) an angle $\alpha_i$ between a plane of an $i^{th}$ diffraction spot and a plane of an $(i+1)^{th}$ diffraction spot that are adjacent in the horizontal or vertical direction in the region to be corrected further comprises:

determining a line segment having the first projection point and the second circle center as end points as a second line segment;

determining a length of the third line segment and a length of the second line segment, respectively; and determining the angle $\alpha_i$ according to the lengths of the third line segment and the second line segment.

4. The method according to claim 3, wherein the determining a length of the third line segment and a length of the second line segment comprises:

determining the length of the third line segment according to a diameter of the $i^{th}$ diffraction spot and a diameter of the $(i+1)^{th}$ diffraction spot; and determining the length of the second line segment according to a projection distance of the $i^{th}$ diffraction spot and a projection distance of the $(i+1)^{th}$ diffraction spot.

5. The method according to claim 1, wherein the method further comprises:

determining position information of the $(i+1)^{th}$ diffraction spot;

determining the $(i+1)^{th}$ region on the projection picture that is covered by the $i^{th}$ diffraction spot, according to the position information of the $(i+1)^{th}$ diffraction spot;

correcting the $(i+1)^{th}$ region on the projection picture according to the corrected projection length of the $(i+1)^{th}$ diffraction spot.

6. The method according to claim 1, wherein the method further comprises:

emitting, by the light generation component, detection light for correcting a projection image projected by the projection device.

7. The method according to claim 1, wherein the projection device comprises an image collection component, and the method comprises:

photographing a projection image projected by the projection device;

photographing a projected image projected through the grating by detection light.

8. A non-transitory computer storage medium storing computer executable instructions which, when executed by one or more processors, cause the one or more processors to:

determine, in a region in which a projection image projected by a projection device overlaps with a projected image projected through the grating by detection light output from the projection device, diffraction spots having a diameter not equal to a preset value as target diffraction spots, wherein the projection device comprises a grating and a light generation component;

determine a group of target diffraction spots continuously arranged in a horizontal or vertical direction, as well as diffraction spots having a diameter equal to the preset value that are respectively located on both sides of the group of target diffraction spots, as a region to be corrected;

determine an angle $\alpha_i$ between a plane of an $i^{th}$ diffraction spot and a plane of an $(i+1)^{th}$ diffraction spot that are adjacent in the horizontal or vertical direction in the region to be corrected, wherein i=1, 2, . . . , N, and N is the total number of spots in the region to be corrected; and determine a corrected projection length of the $(i+1)^{th}$ diffraction spot according to the preset value and angles $\alpha_1$ to $\alpha_i$.

9. The non-transitory computer storage medium according to claim 8, wherein to determine an angle $\alpha_i$ between a plane of an $i^{th}$ diffraction spot and a plane of an $(i+1)^{th}$ diffraction spot that are adjacent in the horizontal or vertical direction in the region to be corrected, the computer executable instructions cause the one or more processors to:

determine a line segment having a first circle center and a second circle center as end points as a first line segment, wherein the first circle center is a circle center of the $i^{th}$ diffraction spot, and the second circle center is a circle center of the $(i+1)^{th}$ diffraction spot;

determine a line segment having the first circle center and a first projection point as end points as a third line segment, the first projection point being a projection point of the second circle center on a plane of the $i^{th}$ diffraction spot; and determine an angle between the first line segment and the third line segment as the angle $\alpha_i$.

10. The non-transitory computer storage medium according to claim 9, wherein to determine an angle $\alpha_i$ between a plane of an $i^{th}$ diffraction spot and a plane of an $(i+1)^{th}$ diffraction spot that are adjacent in the horizontal or vertical direction in the region to be corrected, the computer executable instructions cause the one or more processors to:

determine a line segment having the first projection point and the second circle center as end points as a second line segment;

determine a length of the third line segment and a length of the second line segment, respectively; and determine the angle $\alpha_i$ according to the lengths of the third line segment and the second line segment.

11. The non-transitory computer storage medium according to claim 10, wherein to determine a length of the third line segment and a length of the second line segment, the computer executable instructions cause the one or more processors to:
- determine the length of the third line segment according to a diameter of the $i^{th}$ diffraction spot and a diameter of the $(i+1)^{th}$ diffraction spot; and
- determine the length of the second line segment according to a projection distance of the $i^{th}$ diffraction spot and a projection distance of the $(i+1)^{th}$ diffraction spot.

12. The non-transitory computer storage medium according to claim 8, wherein the computer executable instructions further cause the one or more processors to:
- determine position information of the $(i+1)^{th}$ diffraction spot;
- determine the $(i+1)^{th}$ region on the projection picture that is covered by the $i^{th}$ diffraction spot, according to the position information of the $(i+1)^{th}$ diffraction spot;
- correct the $(i+1)^{th}$ region on the projection picture according to the corrected projection length of the $(i+1)^{th}$ diffraction spot.

13. The non-transitory computer storage medium according to claim 8, wherein the computer executable instructions further cause the one or more processors to:
- instruct the light generation component to emit detection light for correcting a projection image projected by the projection device.

14. The non-transitory computer storage medium according to claim 8, wherein the projection device comprises an image collection component, and the computer executable instructions further cause the one or more processors to:
- instruct the image collection component to photograph a projection image projected by the projection device;
- instruct the image collection component to photograph a projected image projected through the grating by detection light.

15. A projection device comprising: a grating, a light generation component, a processor, and a storage medium configured to store computer executable instructions;
- wherein the processor is configured to execute the computer executable instructions to:
- determine, in a region in which a projection image projected by the projection device overlaps with a projected image projected through the grating by detection light output from the projection device, diffraction spots having a diameter not equal to a preset value as target diffraction spots;
- determine a group of target diffraction spots continuously arranged in a horizontal or vertical direction, as well as diffraction spots having a diameter equal to the preset value that are respectively located on both sides of the group of target diffraction spots, as a region to be corrected;
- determine an angle $\alpha_i$ between a plane of an $i^{th}$ diffraction spot and a plane of an $(i+1)^{th}$ diffraction spot that are adjacent in the horizontal or vertical direction in the region to be corrected, wherein i=1, 2, . . . , N, and N is the total number of spots in the region to be corrected; and
- determine a corrected projection length of the $(i+1)^{th}$ diffraction spot according to the preset value and angles $\alpha_1$ to $\alpha_i$.

16. The projection device according to claim 15, wherein to determine an angle $\alpha_i$ between a plane of an $i^{th}$ diffraction spot and a plane of an $(i+1)^{th}$ diffraction spot that are adjacent in the horizontal or vertical direction in the region to be corrected, the processor is configured to execute the computer executable instructions to:
- determine a line segment having a first circle center and a second circle center as end points as a first line segment, wherein the first circle center is a circle center of the $i^{th}$ diffraction spot, and the second circle center is a circle center of the $(i+1)^{th}$ diffraction spot;
- determine a line segment having the first circle center and a first projection point as end points as a third line segment, the first projection point being a projection point of the second circle center on a plane of the $i^{th}$ diffraction spot; and
- determine an angle between the first line segment and the third line segment as the angle $\alpha_i$.

17. The projection device according to claim 16, wherein to determine an angle $\alpha_i$ between a plane of an $i^{th}$ diffraction spot and a plane of an $(i+1)^{th}$ diffraction spot that are adjacent in the horizontal or vertical direction in the region to be corrected, the processor is configured to execute the computer executable instructions to:
- determine a line segment having the first projection point and the second circle center as end points as a second line segment;
- determine a length of the third line segment and a length of the second line segment, respectively; and
- determine the angle $\alpha_i$ according to the lengths of the third line segment and the second line segment.

18. The projection device according to claim 17, wherein to determine a length of the third line segment and a length of the second line segment, the processor is configured to execute the computer executable instructions to:
- determine the length of the third line segment according to a diameter of the $i^{th}$ diffraction spot and a diameter of the $(i+1)^{th}$ diffraction spot; and
- determine the length of the second line segment according to a projection distance of the $i^{th}$ diffraction spot and a projection distance of the $(i+1)^{th}$ diffraction spot.

19. The projection device according to claim 15, wherein the processor is configured to further execute the computer executable instructions to:
- determine position information of the $(i+1)^{th}$ diffraction spot;
- determine the $(i+1)^{th}$ region on the projection picture that is covered by the $i^{th}$ diffraction spot, according to the position information of the $(i+1)^{th}$ diffraction spot;
- correct the $(i+1)^{th}$ region on the projection picture according to the corrected projection length of the $(i+1)^{th}$ diffraction spot.

20. The projection device according to claim 15, wherein the projection device comprises an image collection component, and the processor is configured to execute the computer executable instructions to:
- instruct the image collection component to photograph a projection image projected by the projection device;
- instruct the image collection component to photograph a projected image projected through the grating by detection light.

* * * * *